(12) United States Patent
Liu et al.

(10) Patent No.: US 10,428,885 B2
(45) Date of Patent: Oct. 1, 2019

(54) BRAKE CYLINDER DUST COVER AND WATERPROOF BRAKE CYLINDER USING SUCH DUST COVER

(71) Applicant: MEISHAN CRRC BRAKE SCIENCE & TECHNOLOGY CO., LTD, Meishan, Sichuan (CN)

(72) Inventors: Yi Liu, Sichuan (CN); Guo Li, Sichuan (CN); Chen Xiao, Sichuan (CN); Jianhong Shen, Sichuan (CN); Hong An, Sichuan (CN); Weiyuan Xiao, Sichuan (CN); Chao Lv, Sichuan (CN); Qiong Quan, Sichuan (CN); Xia Du, Sichuan (CN); Xueli Wei, Sichuan (CN); Fuying Mao, Sichuan (CN); Yunxiao Shi, Sichuan (CN); Liang Lv, Sichuan (CN); Junying Zhang, Sichuan (CN); Qin Wang, Sichuan (CN); Kaien Wang, Sichuan (CN)

(73) Assignee: MEISHAN CRRC BRAKE SCIENCE & TECHNOLOGY CO., LTD, Meishan, Sichuan (CN)

( * ) Notice: Subject to any disclaimer, the term of this patent is extended or adjusted under 35 U.S.C. 154(b) by 174 days.

(21) Appl. No.: 15/500,482

(22) PCT Filed: Sep. 29, 2016

(86) PCT No.: PCT/CN2016/100735
§ 371 (c)(1),
(2) Date: Jan. 30, 2017

(87) PCT Pub. No.: WO2017/177627
PCT Pub. Date: Oct. 19, 2017

(65) Prior Publication Data
US 2018/0202503 A1    Jul. 19, 2018

(30) Foreign Application Priority Data

Apr. 13, 2016 (CN) .................. 2016 2 0304099 U
Jul. 25, 2016 (CN) ..................... 2016 1 0587732

(51) Int. Cl.
*F16D 65/00*    (2006.01)
*B60T 17/00*    (2006.01)
(Continued)

(52) U.S. Cl.
CPC .......... *F16D 65/0025* (2013.01); *B60T 17/00* (2013.01); *B61H 11/00* (2013.01); *F16D 65/16* (2013.01); *F16D 2121/04* (2013.01)

(58) Field of Classification Search
CPC .. F16D 65/0025; F16D 65/16; F16D 2121/04; B60T 17/00; B61H 11/00
See application file for complete search history.

(56) References Cited

U.S. PATENT DOCUMENTS 3,372,775 A * 3/1968 Beller ................. F16D 55/2255
                                                188/196 BA
3,447,647 A * 6/1969 Stipanovic ............. B60T 13/44
                                                188/153 R
(Continued)

*Primary Examiner* — Melody M Burch
(74) *Attorney, Agent, or Firm* — Novick, Kim & Lee, PLLC; Allen Xue

(57) ABSTRACT

A brake cylinder dust cover is installed on a waterproof brake cylinder. The brake cylinder includes a brake cylinder body and a front cover. A waterproof dust cover assembly is arranged on the front cover. The waterproof dust cover assembly includes a dust cover fixedly connected to the front cover, and a filter felt support and a filter felt pad which are arranged in the dust cover. The filter felt support is connected with the dust cover, and the filter felt pad is fixed on the filter felt support. An outwards extending skirt is arranged at the edge of the dust cover in the axial direction thereof.

8 Claims, 5 Drawing Sheets

(51) Int. Cl.
   *B61H 11/00* (2006.01)
   *F16D 65/16* (2006.01)
   *F16D 121/04* (2012.01)

(56) References Cited

U.S. PATENT DOCUMENTS

| | | | | |
|---|---|---|---|---|
| 3,498,622 A | * | 3/1970 | Belart | F16D 65/00 |
| | | | | 277/634 |
| 4,016,318 A | * | 4/1977 | DiGioia | B60N 3/048 |
| | | | | 156/242 |
| 5,458,344 A | * | 10/1995 | Weiler | F16D 65/18 |
| | | | | 277/634 |
| 8,240,642 B2 | * | 8/2012 | Hamberg | F16F 9/58 |
| | | | | 188/267.2 |

\* cited by examiner

BRAKE CYLINDER DUST COVER AND WATERPROOF BRAKE CYLINDER USING SUCH DUST COVER

FIELD OF THE INVENTION

The invention belongs to the technical field of brake cylinder for vehicle, in particular to a brake cylinder dust cover and a waterproof brake cylinder using such dust cover.

DESCRIPTION OF THE RELATED ART

A brake cylinder for a railway vehicle is generally mounted at the bottom of the vehicle, and the body of the vehicle (e.g. gondola car and box car) will prevent rain water from entering the cylinder. However, the bodies of some types of vehicles (e.g. flat car, tank car and cement truck) do not shelter the whole brake cylinders, so that rain water is easy to fall down to and enter the brake cylinder.

As shown in FIG. 1 an existing brake cylinder for a railway vehicle has a dustproof function only and lacks waterproof function. Once water falls down to the brake cylinder in rainy days, rain water is very easy to flow from the places A, B and C in FIG. 1 into the brake cylinder. Especially when the brake cylinder is released, negative pressure will appear at the right side of the piston of the brake cylinder, so that rain water is easy to be pumped into the cylinder, resulting in pollution and corrosion in the brake cylinder, which greatly reduces the service life of the brake cylinder and affects driving safety.

SUMMARY OF THE INVENTION

To address the problems, the purpose of the invention is to provide a brake cylinder dust cover that can effectively prevent rain water from entering the brake cylinder so as to increase the service life of the brake cylinder and ensure safe driving, and to provide a waterproof brake cylinder using such dust cover.

The technical solution of the invention is realized by a brake cylinder dust cover, wherein the brake cylinder dust cover is fixedly connected to a front cover of the brake cylinder, characterized in that an outwards extending skirt is arranged at the edge of the brake cylinder dust cover in the axial direction thereof.

The brake cylinder dust cover according to the invention, wherein the skirt takes the shape of a bell mouth as a whole.

The brake cylinder dust cover according to the invention, wherein the skirt and the brake cylinder dust cover are formed into an integrated structure A waterproof brake cylinder using the brake cylinder dust cover comprises a brake cylinder body and a front cover. A waterproof dust cover assembly is arranged on the front cover. The waterproof dust cover assembly comprises a dust cover fixedly connected to the front cover of brake cylinder, and a filter felt support and a filter felt pad which are arranged in the brake cylinder dust cover. The filter felt support is connected with the brake cylinder dust cover, and the filter felt pad is fixed on the filter felt support. An outwards extending skirt is arranged at the edge of the brake cylinder dust cover in the axial direction thereof.

The waterproof brake cylinder according to the invention, wherein an outwards extending boss is arranged at a vent of the brake cylinder dust cover in the axial direction thereof.

The waterproof brake cylinder according to the invention, wherein a waterproof ring seat for mounting a filter cover of front cover is arranged in the front cover, the waterproof ring seat is sleeved on a piston rod of the brake cylinder, a double-lip waterproof ring is arranged on the waterproof ring seat and between the waterproof ring seat and the piston rod, and an O seal ring is arranged on the waterproof ring seat and between the waterproof ring seat and the front cover.

The waterproof brake cylinder according to the invention, wherein a ring slot is arranged at the outer end face of the waterproof ring seat, and the O seal ring is assembled in the ring slot.

By providing an existing brake cylinder with a sealing structure at the position liable to water, the invention can effectively prevent rain water from being sucked into the cylinder by the negative pressure formed in the brake cylinder when the brake cylinder is released, thus playing the waterproof role, which increases the service life of the cylinder and ensures safe driving.

Marks in the figures: 1—brake cylinder body; 2—front cover; 3—waterproof dust cover assembly; 4—brake cylinder dust cover; 5—filter felt support; 6—filter felt pad; 7—skirt; 8—boss; 9—ring slot; 10—filter cover of front cover; 11—waterproof ring seat; 12—piston rod; 13—double-lip waterproof ring; 14—O seal ring B; and 15—release spring.

DESCRIPTION OF THE PREFERRED EMBODIMENT

The invention will be described in detail in combination with accompanied drawings.

In order to make the purpose, technical solution and advantages of the invention more clear, the invention will be described in detail in combination with accompanied drawings and embodiments. It should be understood that various embodiments described herein are only used to explain the invention rather than defining the invention.

Figure 2:
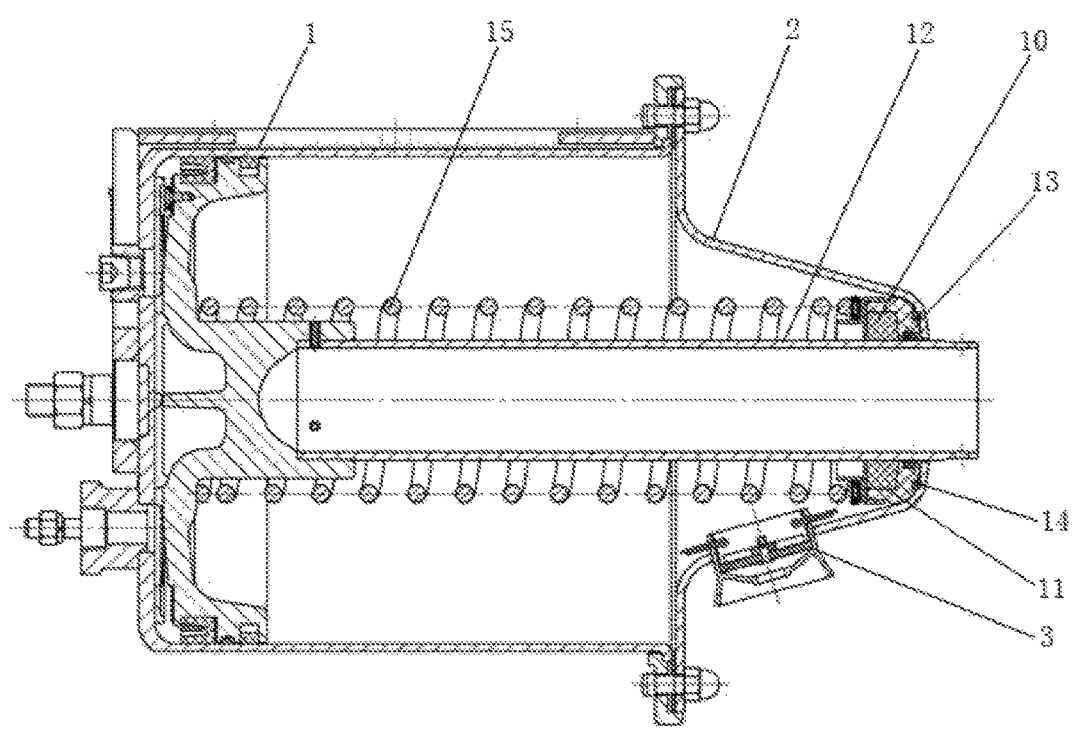
FIG. 2 is a structural diagram of the invention.
Figure 3:
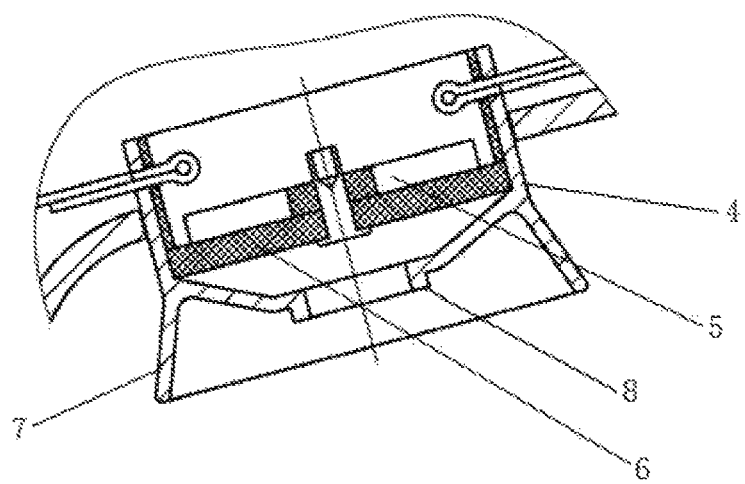
FIG. 3 is an enlarged view of the waterproof dust cover assembly in FIG. 2.

As shown in FIG. 2 and FIG. 3, a waterproof brake cylinder comprises a brake cylinder body 1 and a front cover 2. A waterproof dust cover assembly 3 is arranged on the front cover 2. The waterproof dust cover assembly 3 comprises a brake cylinder dust cover 4 fixedly connected to the front cover 2, and a filter felt support 5 and a filter felt pad 6 which are arranged in the brake cylinder dust cover 4. The filter felt support 5 is connected with the brake cylinder dust cover 4, and the filter felt pad 6 is fixed on the filter felt support 5. An outwards extending skirt 7 is arranged at the edge of the brake cylinder dust cover 4 in the axial direction thereof. The skirt 7 and the brake cylinder dust cover 4 are formed into an integrated structure. The skirt 7 takes the shape of a bell mouth as a whole. An outwards extending boss 8 is arranged at a vent of the brake cylinder dust cover 4 in the axial direction thereof, thus further preventing rain water from entering the dust cover.

As shown in FIG. 3, when rain water flows down along the brake cylinder dust cover, rain water will fall down along the skirt directly because of the water retaining effect of the skirt on the brake cylinder dust cover so as to isolate the gas passage from the flowing path of rain water, which plays a waterproof role. When the brake cylinder is released, negative pressure is formed above the filter felt pad of a filter assembly. However, as rain water cannot reach the place C of the brake cylinder dust cover due to the block from the skirt, rain water will not be sucked into the cylinder. Even if a small part of the rain water flows to the place C, rain water will be stopped by the boss at the place C again, which ensures that rain water can not enter the brake cylinder dust cover.

Figure 4:
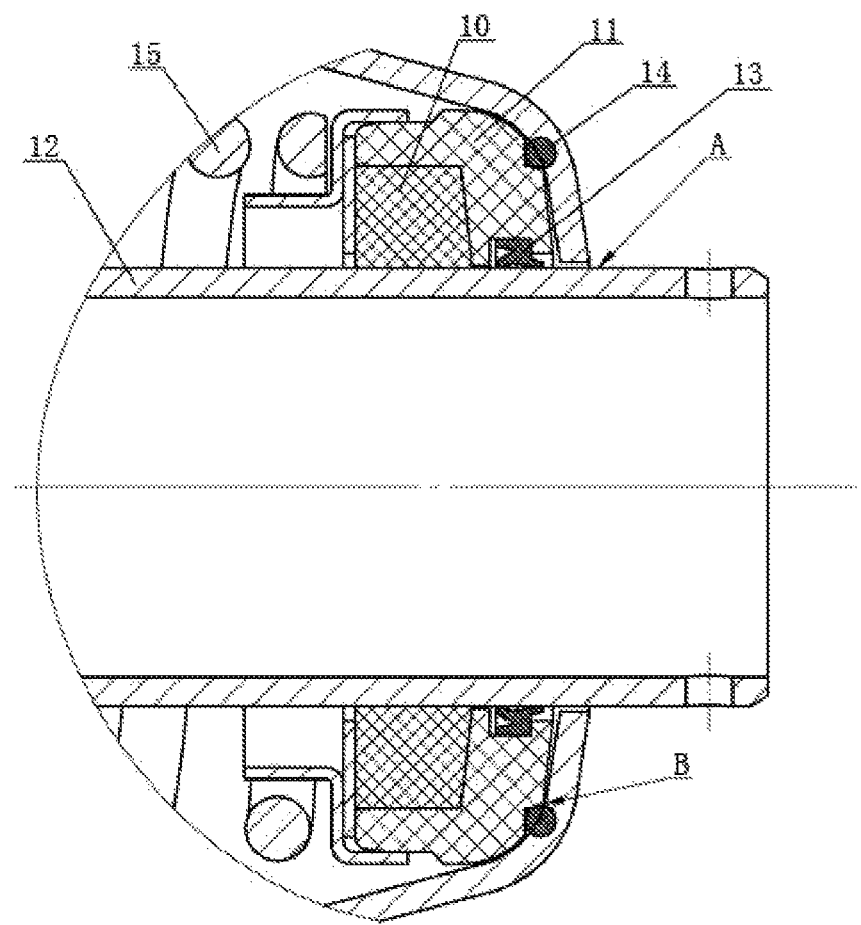
FIG. 4 is a waterproof diagram of the front cover end in the invention.
Figure 5:
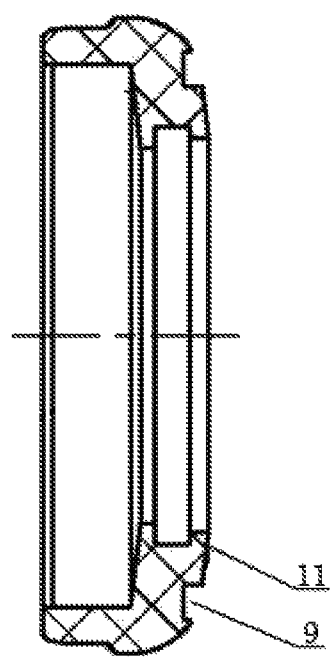
FIG. 5 is a structural diagram of a waterproof ring seat of the invention.

As shown in FIG. 4, a waterproof ring seat 11 for mounting the filter cover 10 of front cover is arranged in the front cover 2, and the waterproof ring seat 11 is sleeved on the piston rod 12 of the brake cylinder. A double-lip waterproof ring 13 is arranged on the waterproof ring seat 11 and between the waterproof ring seat 11 and the piston rod 12. The double-lip waterproof ring is made from high-hardness polyurethane, which reduces friction with the piston rod, and can prevent rain water from entering the cylinder body from the place A. An O seal ring 14 is arranged on the waterproof ring seat 11 and between the waterproof ring seat 11 and the front cover 2. As shown in FIG. 5, a ring slot 9 is arranged at the outer end surface of the waterproof ring seat 11, and the O seal ring 14 is assembled in the ring slot 9. With the acting force of a release spring 15, the O seal ring 14 deforms and plays a sealing role, which prevents rain water from entering the cylinder from the place B between the front cover and a dust ring mounting base. The filter cover of front cover is sealed through the O seal ring and the double-lip waterproof ring, which avoids direct contact with the atmosphere, reduces volatilization of 89 M lubricating grease stored in the cover, slows oxidative deterioration down and is useful for lubrication and rust protection of the piston rod.

Figure 1:
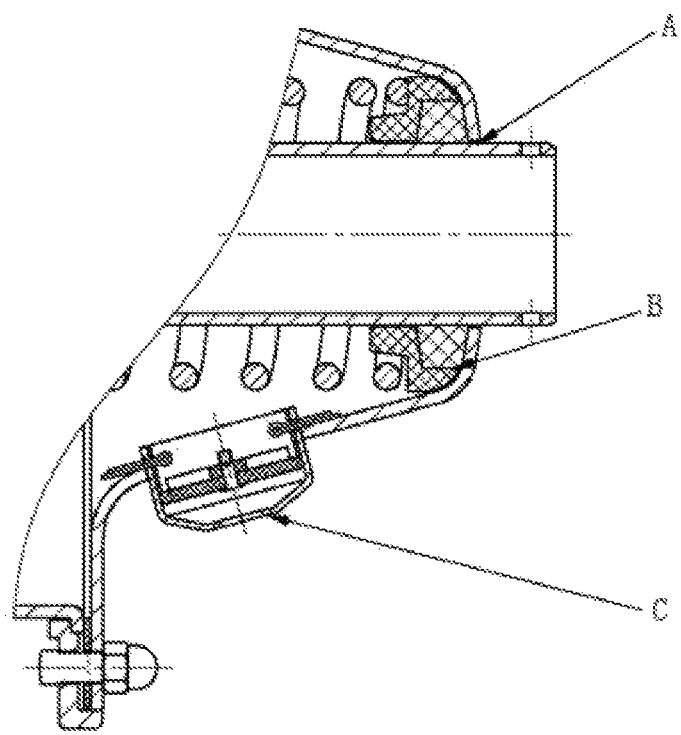
FIG. 1 is a diagram illustrating a conventional front cover assembly for a brake cylinder.

The invention makes structural improvement for the three water leakage positions A, B and C in FIG. 1. The invention provides a seal structure to play a waterproof role, thus effectively preventing pollution and corrosion in the brake cylinder due to rain water, which greatly reduces the service life of the brake cylinder and ensures safe driving.

The above mentioned examples are preferred examples of the invention only and not used to limit the invention. Any modification, equivalent replacement and improvement made within the range of the spirit and principle of the invention shall be incorporated in the protection scope of the invention.

The invention claimed is:

1. A brake cylinder dust cover for a brake cylinder, comprising: a cylindrical base having an axis, a cap having a boss in a center thereof, and a skirt having a first end and a second end that are connected by a slanted wall,
    wherein the first end of the skirt is connected to the cylindrical base and the slanted wall extends in a direction that is at an acute angle with the axis of the cylindrical base so that a circumference of the second end is larger than a circumference of the first end, and
    wherein the boss is coaxial with the cylindrical base.

2. The brake cylinder dust cover according to claim 1, wherein the skirt has a shape of a truncated cone with the first end being the smaller circle and the second end being the larger circle.

3. The brake cylinder dust cover according to claim 1, wherein the cylindrical base, the cap, and the skirt form an integrated structure.

4. A waterproof brake cylinder, comprising: a brake cylinder body, a front cover affixed to the brake cylinder body, and a waterproof dust cover assembly arranged on the front cover, wherein the waterproof dust cover assembly comprises a brake cylinder dust cover of claim 1, and a filter felt support, and a filter felt pad, wherein the filter felt support is connected to the brake cylinder dust cover and the filter felt pad is affixed to the filter felt support.

5. The waterproof brake cylinder according to claim 4, wherein the boss has a lip extending out from the cap in the axial direction of the cylindrical base.

6. The waterproof brake cylinder according to claim 4, further comprising: a waterproof ring seat sleeved over a piston rod; a double-lip waterproof ring disposed between the waterproof ring seat and the piston rod; and an O seal ring arranged on the waterproof ring seat and disposed between the waterproof ring seat and the front cover.

7. The waterproof brake cylinder according to claim 6, wherein the O seal ring resides about a ring slot arranged on an outer end face of the waterproof ring seat.

8. The brake cylinder dust cover according to claim 1, wherein the boss has a lip extending out from the cap in the axial direction of the cylindrical base.

* * * * *